US010338673B2

(12) United States Patent
Chen et al.

(10) Patent No.: US 10,338,673 B2
(45) Date of Patent: Jul. 2, 2019

(54) TOUCHSCREEN HOVER DETECTION IN AN AUGMENTED AND/OR VIRTUAL REALITY ENVIRONMENT

(71) Applicant: GOOGLE INC., Mountain View, CA (US)

(72) Inventors: Shiqi Chen, Mountain View, CA (US); Dominik Philemon Kaeser, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 11 days.

(21) Appl. No.: 15/251,573

(22) Filed: Aug. 30, 2016

(65) Prior Publication Data
US 2017/0076502 A1 Mar. 16, 2017

Related U.S. Application Data

(60) Provisional application No. 62/219,423, filed on Sep. 16, 2015.

(51) Int. Cl.
*G06F 3/01* (2006.01)
*G06T 19/00* (2011.01)
(Continued)

(52) U.S. Cl.
CPC .............. *G06F 3/011* (2013.01); *G06F 1/163* (2013.01); *G06F 1/1626* (2013.01);
(Continued)

(58) Field of Classification Search
CPC .................................................... G06T 19/006
See application file for complete search history.

(56) References Cited

U.S. PATENT DOCUMENTS

| 7,920,165 B2 | 4/2011 | Adderton | |
| 8,502,780 B1 * | 8/2013 | Park | G06F 3/04886 345/165 |

(Continued)

FOREIGN PATENT DOCUMENTS

| EP | 1983402 A1 | 10/2008 |
| KR | 20140064384 A | 5/2014 |
| WO | 2014/179890 A1 | 11/2014 |

OTHER PUBLICATIONS

International Search Report and Written Opinion received for PCT Patent Application No. PCT/US2016/049864, dated Nov. 14, 2016, 14 pages.

(Continued)

*Primary Examiner* — Phi Hoang
(74) *Attorney, Agent, or Firm* — Brake Hughes Bellermann LLP

(57) ABSTRACT

A system for detecting and tracking a hover position of a manual pointing device, such as finger(s), on a handheld electronic device may include overlaying a rendered monochromatic keying screen, or green screen, on a user interface, such as a keyboard, of the handheld electronic device. A position of the finger(s) relative to the keyboard may be determined based on the detection of the finger(s) on the green screen and a known arrangement of the keyboard. An image of the keyboard and the position of the finger(s) may be rendered and displayed, for example, on a head mounted display, to facilitate user interaction via the keyboard with a virtual immersive experience generated by the head mounted display.

20 Claims, 11 Drawing Sheets

(51) Int. Cl.
  *G06K 9/00* (2006.01)
  *G06F 3/041* (2006.01)
  *G06F 1/16* (2006.01)
  *G06F 3/03* (2006.01)
  *G06F 3/0488* (2013.01)

(52) U.S. Cl.
  CPC ............ *G06F 3/0304* (2013.01); *G06F 3/041* (2013.01); *G06F 3/04883* (2013.01); *G06F 3/04886* (2013.01); *G06K 9/00362* (2013.01); *G06F 2203/04101* (2013.01)

(56) References Cited

U.S. PATENT DOCUMENTS

| | | | |
|---|---|---|---|
| 2012/0069131 A1 | 3/2012 | Abelow | |
| 2014/0176562 A1* | 6/2014 | Somerfield | G06T 11/203 345/443 |
| 2014/0364197 A1* | 12/2014 | Osman | A63F 13/00 463/24 |
| 2015/0054734 A1* | 2/2015 | Raghoebardajal | G06F 3/017 345/156 |
| 2015/0258432 A1* | 9/2015 | Stafford | A63F 13/213 463/32 |
| 2016/0140764 A1* | 5/2016 | Bickerstaff | G02B 27/017 345/633 |

OTHER PUBLICATIONS

Office Action and English Translation for Korean Application No. 10-2017-7031225, dated Mar. 28, 2019, 15 pages.

\* cited by examiner

TOUCHSCREEN HOVER DETECTION IN AN AUGMENTED AND/OR VIRTUAL REALITY ENVIRONMENT

CROSS REFERENCE TO RELATED APPLICATIONS

This application claims priority to U.S. Provisional Application No. 62/219,423, filed Sep. 16, 2015, the disclosure of which is incorporated herein by reference.

FIELD

This document relates, generally, to detection and tracking of an electronic device in an immersive augmented reality and/or virtual reality system.

BACKGROUND

An augmented reality (AR) and/or a virtual reality (VR) system may generate a three-dimensional (3D) immersive environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the virtual environment, user interaction with the virtual environment may take various forms, such as, for example, physical movement and/or physical interaction with virtual elements in the virtual environment, and/or manipulation of an electronic device to interact with, personalize and control the virtual environment.

SUMMARY

In one aspect, a method may include generating, by a head mounted electronic device operating in an ambient environment, a virtual environment, generating, within a display of a handheld electronic device operating in the ambient environment, a mono-chromatic screen overlaid on a user interface within the display of the handheld electronic device, while maintaining touchscreen functionality of the user interface, detecting, by a camera of the head mounted electronic device, a physical object in a foreground of the mono-chromatic screen, determining, by a processor of the head mounted electronic device, a position of the detected physical object relative to the user interface based on a detected position of the physical object in the foreground of the mono-chromatic screen, and displaying, by the head mounted electronic device, a virtual image of the user interface and a virtual image of the detected physical object on a display of the head mounted electronic device.

In another aspect, a system may include a head mounted electronic device including a display, a camera and a processor, the head mounted electronic device configured to be operably coupled with a handheld electronic device, wherein the camera is configured to capture an image of the handheld electronic device, and the processor is configured to segment an image of a physical object detected between the head mounted electronic device and the handheld electronic device, and to display a virtual image in a virtual scene generated by the head mounted electronic device based on the image captured by the camera, the virtual image displayed in the virtual scene including a virtual image of the detected physical object, and a virtual image of a user interface of the handheld electronic device, the user interface being overlaid by a mono-chromatic screen rendered on the handheld electronic device, in a virtual scene generated by the head mounted electronic device, based on the image captured by the camera.

In another aspect, a computer program product embodied on a non-transitory computer readable medium may include, stored thereon, a sequence of instructions which, when executed by a processor causes the processor to execute a method, including generating a virtual environment in a head mounted electronic device operating in an ambient environment, capturing, by a camera of the head mounted electronic device, an image of a handheld electronic device operably coupled with the head mounted electronic device, detecting, in the image captured by the camera, a physical object in a foreground of a mono-chromatic screen overlaid on a user interface on the handheld electronic device, the user interface maintaining functionality beneath the mono-chromatic screen, separating the detected physical object from the image captured by the camera and generating an image of the separated physical object, detecting a position of the detected physical object relative to the user interface based on a detected position of the physical object in the foreground of the mono-chromatic screen, and displaying a virtual image in the virtual environment generated by the head mounted electronic device, the virtual image including a virtual image of the user interface and a virtual image of the separated physical object separated from the image captured by the camera The details of one or more implementations are set forth in the accompanying drawings and the description below. Other features will be apparent from the description and drawings, and from the claims.

DETAILED DESCRIPTION

Figure 1:
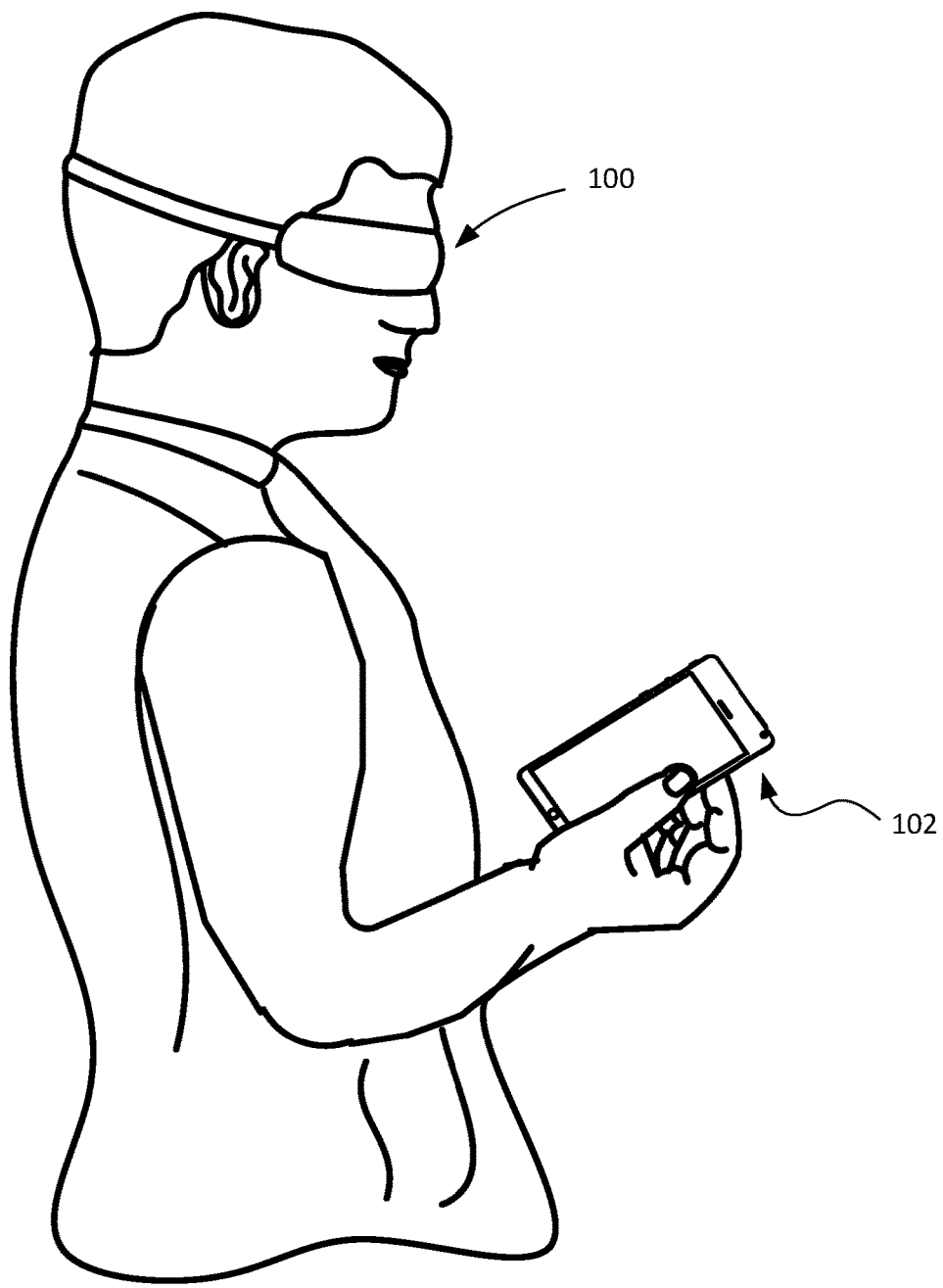
FIG. 1 is an example of an augmented and/or virtual reality system including a head mounted display device and a handheld electronic device, in accordance with implementations described herein.

A user immersed in a virtual environment, for example, a 3D augmented and/or virtual reality environment, wearing, for example, a head mounted display (HMD) device may explore the virtual environment and interact with the virtual environment through, for example, physical interaction (such as, for example, hand/arm gestures, head movement, walking and the like), and/or manipulation of the HMD, and/or manipulation of a separate electronic device, to experience the immersive virtual environment. For example, in some implementations, the HMD may be paired with a handheld electronic device, such as, for example, a controller, a smartphone or other such handheld electronic device. User manipulation of the handheld electronic device paired with the HMD may allow the user to interact with the virtual environment generated by the HMD, and/or may allow the user to make use of other functionality of the handheld electronic device while immersed in the virtual environment.

In some implementations, a user may manipulate the handheld electronic device paired with the HMD to cause a desired action in the virtual environment generated by the HMD. In some situations, because a display of the HMD is displaying the virtual environment, and/or one or more virtual objects, it may be difficult for the user to provide some types of inputs on the handheld electronic device, as it may be difficult for the user to view the handheld electronic device, and in particular, it may be difficult for the user to manipulate a user interface of the handheld electronic device while wearing the HMD. For example, it may be difficult for a user to make a text entry using a keyboard user interface of the handheld electronic device without being able to see the keyboard on the handheld electronic device and/or a finger position relative to the keyboard on the handheld electronic device.

To address at least some of the issues noted above, in some implementations, a mono-chromatic screen, such as a green screen, may be rendered and/or overlaid on a display of the handheld electronic device, and in particular, overlaid on a display of a user interface on the handheld electronic device, so that a hover position of the user's hand/fingers may be detected by, for example a camera of the HMD. Touchscreen functionality of the user interface may be maintained within the display area of the handheld electronic device, even though the mono-chromatic screen is overlaid on the user interface and thus is not actually visible on the display. The user interface of the handheld electronic device may be virtually rendered and displayed in the virtual environment generated by the HMD for viewing and use by/interaction with the user. Accordingly, the user may be able to physically interact with the user interface of the handheld electronic device and make use of the functionality of the user interface within the display area of the handheld electronic device, even though the user interface is not visible to the user on the handheld electronic device, but instead is virtually displayed in the virtual environment generated by the HMD. The user may accurately interact with the user interface and make use of the functionality provided by the user interface based on the virtual user interface that is virtually displayed within the virtual environment generated by the HMD.

In some implementations, an image of a finger hover position, detected based on an image capture of the user's finger against the monochromatic screen overlaid on the user interface of the handheld electronic device, may be virtually displayed, together with the virtual rendering of the user interface, for example, a virtual keyboard, in the virtual environment generated by the HMD, so that the user may view the virtual rendering of the keyboard and relative finger position on the keyboard without having direct physical visibility of the keyboard displayed on the handheld electronic device, to facilitate text entry. In some implementations, the rendering of a mono-chromatic screen, or green screen, for detection of finger hover position may allow, for example, a simple RGB camera of the HMD to accurately detect and track finger position, essentially in real time, in a relatively efficient and accurate manner. The detected finger position may be virtually displayed in the virtual environment generated by the HMD (for example, together with the user interface) as a pass through image captured by the camera of the HMD, as a virtual image rendered by, for example, a processor of the HMD based on the image captured by the camera of the HMD, and the like.

In the example implementation shown in FIG. 1, a user wearing an HMD 100 is holding a portable handheld electronic device 102, such as, for example, a controller, a smartphone, or other portable handheld electronic device which may be operably coupled with, or paired with the HMD 100 for interaction in the virtual environment generated by the HMD 100. In the example shown in FIG. 1, the user is holding the handheld electronic device 102 in a portrait orientation, in his right hand. However, the user may also hold the portable electronic device 102 with only his left hand, or both his right hand and his left hand, and/or in a landscape orientation, depending on a particular input interface, input mode, and other such factors, and still interact with the virtual environment generated by the HMD 100. To address at least some of the issues noted above, in some implementations, a mono-chromatic screen, such as a green screen, or other color screen, may be rendered and/or overlaid on a display of the handheld electronic device, and in particular, overlaid on a display of a user interface on the handheld electronic device, so that a hover position of the user's hand/fingers may be detected by, for example a camera of the HMD.

Figure 2A:
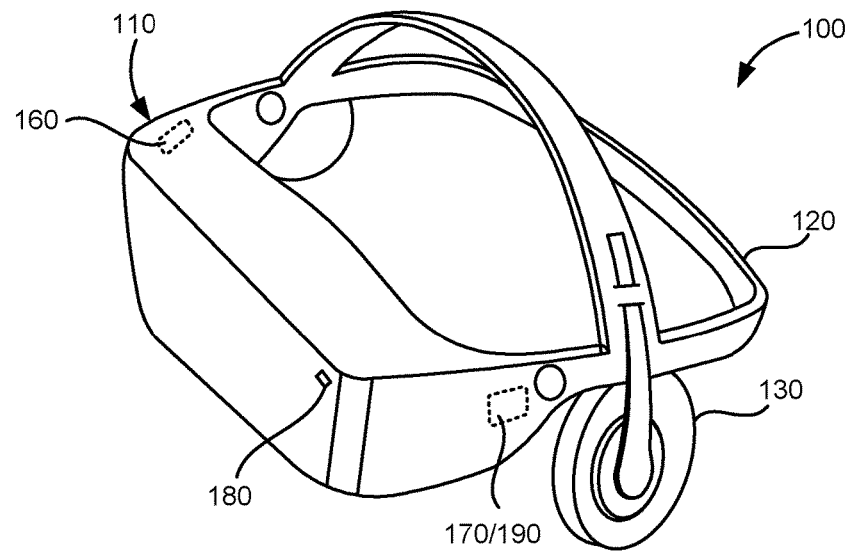
FIGS. 2A and 2B are perspective views of an example head mounted display, in accordance with implementations described herein.
Figure 2B:
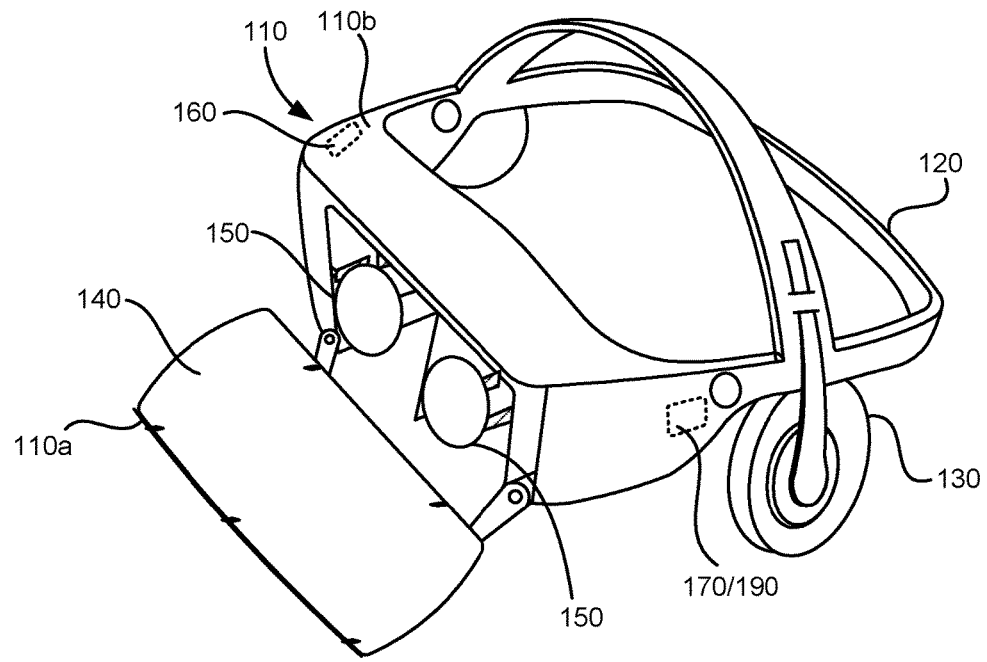

FIGS. 2A and 2B are perspective views of an example HMD, such as, for example, the HMD 100 worn by the user in FIG. 1 to generate an immersive virtual environment to be experienced by the user. The HMD 100 may include a housing 110 in which optical components may be received. The housing 110 may be coupled, for example, rotatably coupled and/or removably attachable, to a frame 120 which allows the housing 110 to be mounted or worn on the head of the user. An audio output device 130 may also coupled to the frame 120, and may include, for example, speakers mounted in headphones and coupled on the frame 120. In FIG. 2B, a front face 110a of the housing 110 is rotated away from a base portion 110b of the housing 110 so that some of the components received in the housing 110 are visible. A display 140 may be mounted on the front face 110a of the housing 110. Lenses 150 may be mounted in the housing 110, between the user's eyes and the display 140 when the front face 110a is in the closed position against the base portion 110b of the housing 110. A position of the lenses 150 may be may be aligned with respective optical axes of the user's eyes to provide a relatively wide field of view and relatively short focal length.

In some implementations, the HMD 100 may also include a sensing system 160 including various sensing system devices and a control system 170 including various control system devices to facilitate operation of the HMD 100. The control system 170 may also include a processor 190 operably coupled to the components of the control system 170.

In some implementations, the HMD 100 may also include a camera 180 which may capture still and/or moving images of the ambient, or physical, or real world environment, outside of the HMD 100 and the virtual environment generated by the HMD 100. For example, in some implementations, the camera 180 may capture an image, or series of images, of the user's finger(s) and/or hand(s) relative to a surface, for example, a display surface on which a user interface may be displayed, of a handheld electronic device, such as, for example, the handheld electronic device 102 shown in FIG. 1, operably coupled with the HMD 100. In some implementations, the camera 180 may capture still and/or moving images of elements in the real world environment in which the augmented and/or virtual reality system operates.

These images of the real world environment, including the images of the user's finger(s) and/or hand(s) relative to the handheld electronic device 102, may be displayed to the user on the display 140 of the HMD 100 in a pass through mode. In some implementations, this may allow the user to view a pass through image of the captured elements of the real world environment, for example, a pass through image of the user's finger(s) and/or hand(s) overlaid on a virtual rendering of the user interface, such as for example, the keyboard, in the virtual environment. In some implementations, this may allow the user to temporarily leave the virtual environment and return to the real world environment without removing the HMD 100 or otherwise changing the configuration of the HMD 100 to move the housing 110 out of the line of sight of the user. In some implementations, the camera 180 may be a depth camera that can determine a distance from the camera 180 on the HMD 100 to, for example, the user's hand(s) holding the handheld electronic device 102, based on the relatively consistent infrared (IR) response of skin.

Figure 3A:
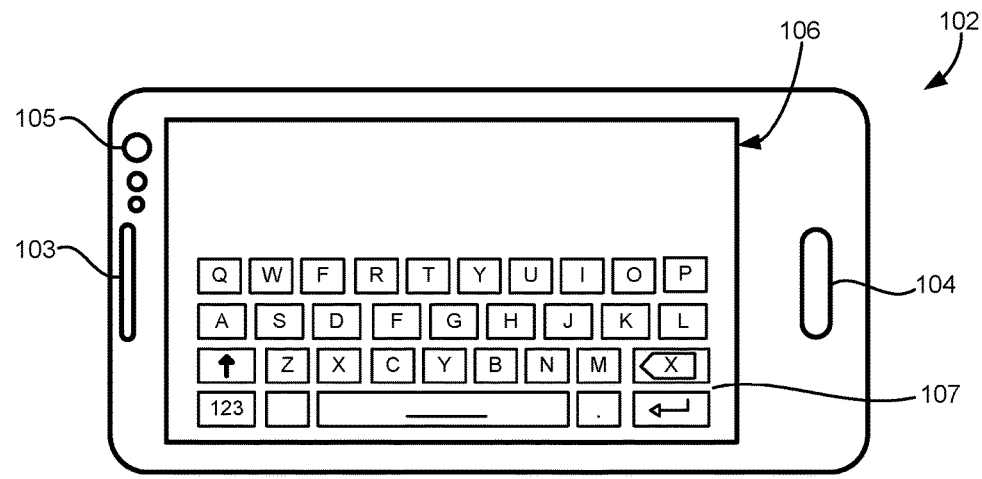
FIGS. 3A and 3B are front views of an example handheld electronic device, in accordance with implementations described herein.

As shown in FIG. 3A, in some implementations, the handheld electronic device 102 may include an audio output device 103, such as, for example, a speaker, an audio input device 104, such as, for example, a microphone, an imaging device 105, such as, for example, a camera, and a display 106 displaying images on the handheld electronic device 102. In some implementations, the display 106 may be a touch sensitive display 106 so that the display 106 may output images, and may also output a user interface including regions designated to receive a user input via a touch sensitive surface of the touch sensitive display 106. In some implementations, the handheld electronic device 102 may render a graphical user interface on the touch sensitive display 106, such as, for example, a keyboard 107 or other type of user interface, configured to receive user touch inputs. The user interface can be configured so that interactions with the user interface can trigger functionality associated with physical regions of a display area of the display 106.

Figure 3B:
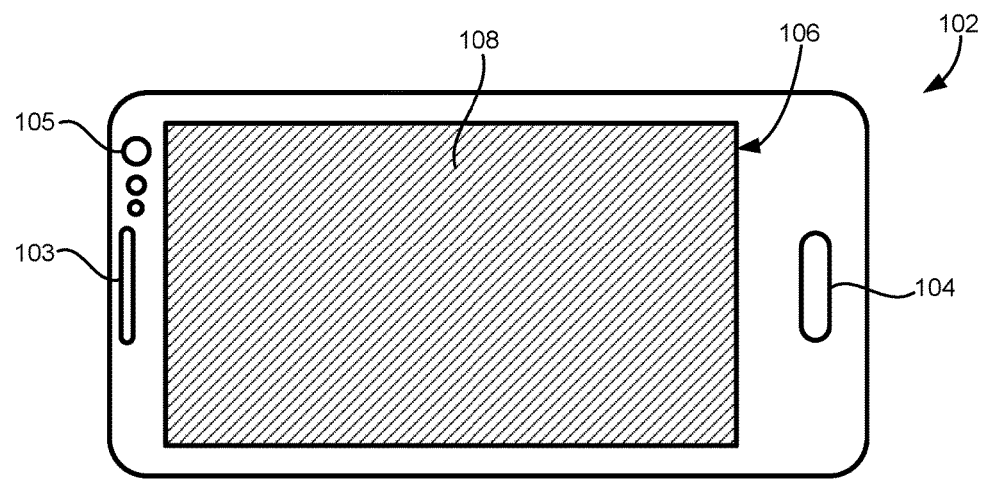

In some implementations, the handheld electronic device 102 may render a mono-chromatic screen, or a green screen overlay 108 on the display 106 of the handheld electronic device 102, as shown in FIG. 3B. The green screen overlay 108 can be displayed within a display area of the display 106 while the underlying functionality associated with the user interface, for example as shown in FIG. 3A, is maintained. With the green screen overlay 108 on the display 106, a hover position of the user's finger(s) relative to the touch sensitive display 106, and relative to individual input elements of the graphical user interface, such as the keyboard 107, may be quickly and accurately detected by, for example, the camera 180 of the HMD 100 (while still maintaining the underlying functionality of the user interface). Said differently, in some implementations, the graphical user interface, such as the keyboard 107, may remain active while covered, or overlaid by the green screen overlay 108, so that a user input, such as a touch detected on the touch sensitive surface of the handheld electronic device 102, may generate a corresponding user input even though the graphical user interface, or keyboard 107, is not visible on the display 106 of the handheld electronic device 102 due to the rendering of the green screen overlay 108. The user may be able to accurately interact with the user interface, or keyboard 107, because the user interface and/or handheld electronic device 102 may be rendered and displayed to the user within the virtual environment generated by the HMD 100.

In some situations, the green screen overlay 108 on the display 106 may provide a measure of security when the user interacts with the user interface, such as the keyboard 107, to enter sensitive information such as, for example, login information including usernames, passwords and the like. That is, in this arrangement, the keyboard 107, and entries made using the keyboard 107, are only visible to the user, and not to other parties, as the user interface, such as the keyboard 107, remains functional at the touch sensitive surface of the display 106, but is not visible to other parties at the display 106 of the handheld electronic device 102 because of the green screen overlay 108.

The example user interface 107 displayed on the display 106 of the handheld electronic device 102 shown in FIG. 3A is a keyboard, that can receive a user's touch input and translate that touch input into a text input in, for example a text entry field displayed on the display 106 of the handheld electronic device 102, and/or the in virtual environment generated by the HMD 100. A keyboard is shown as an example of the user interface in FIG. 3A, and described hereinafter, simply for ease of explanation and illustration. The user interface may include numerous other types of user interfaces, including other features and elements, in addition to or instead of, a keyboard, such as, for example, selection buttons, slide buttons, menu items, and the like.

Figure 4:
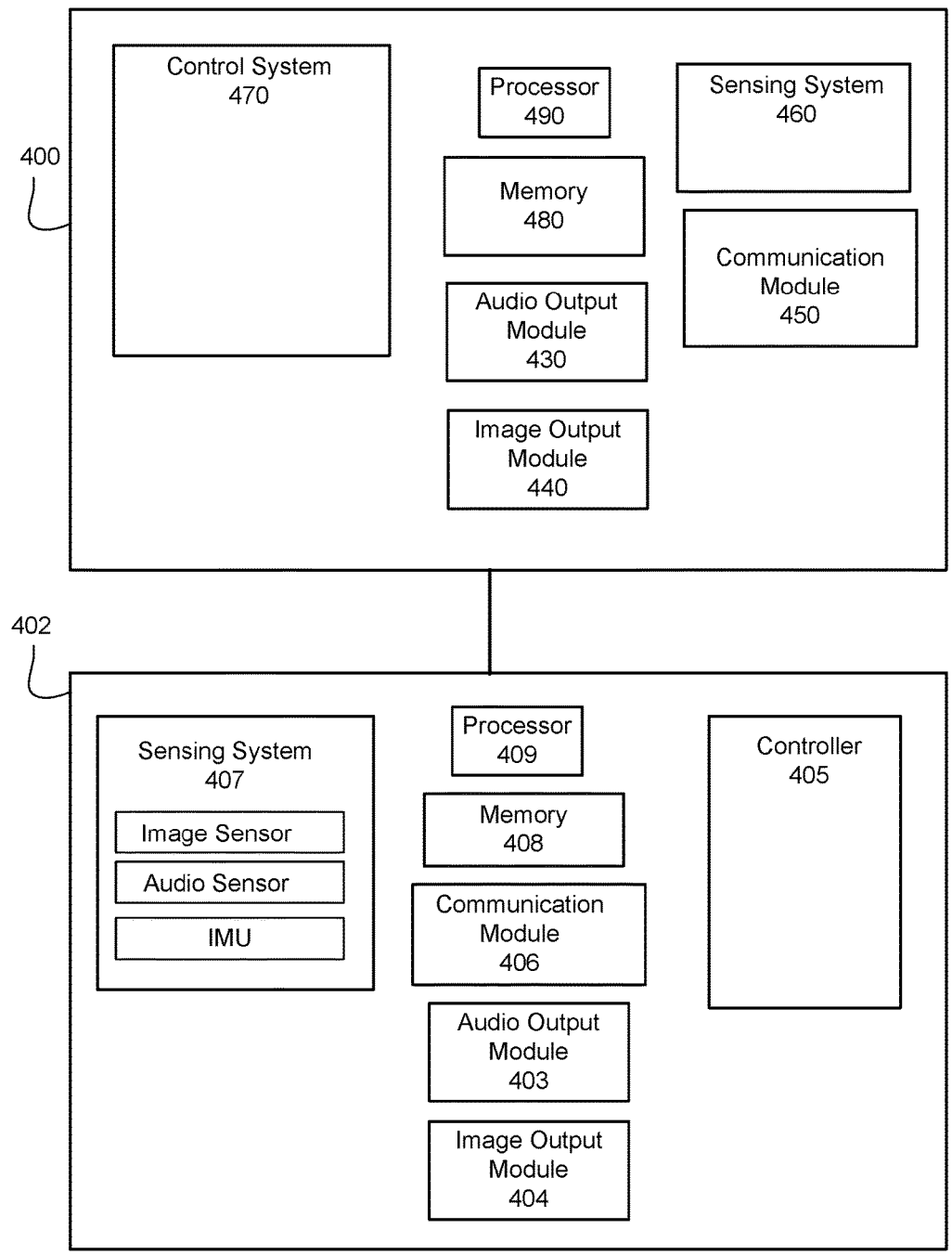
FIG. 4 is a block diagram of a first electronic device and a second electronic device of an augmented and/or virtual reality system, in accordance with implementations described herein.

Similarly, the user interface 107 displayed on the display 106 of the handheld electronic device 102 shown in FIG. 3A is a keyboard rendered with the handheld electronic device 102 oriented in the landscape position, in which the device 102 may be held in both the left and right hands of the user for text entry with finger(s) of both the left and right hands. However, the user interface 107, in the form of a keyboard or other user interface based on a particular application, may also be displayed with the handheld electronic device 102 oriented in the portrait position, in which the device 102 may be held in one of the left hand or the right hand of the user, or both the left and right hands of the user, for text entry with finger(s) of the one of the left hand or the right hand, or both the left and right hands. In either the landscape orientation or the portrait orientation, the user interface may include numerous other features, in addition to or instead of, a keyboard, such as, for example, selection buttons, slide buttons, menu items, and the like A block diagram of a system for detecting and tracking a hover position of a manual pointing device, such as a user's hand and/or finger, with respect to a handheld electronic device in a virtual reality environment is shown in FIG. 4. The system may include a first electronic device 400 in communication with a second electronic device 402. The first electronic device 400 may be, for example an HMD as described above with respect to FIGS. 1 and 2A-2B, generating a virtual environment, and the second electronic device 402 may be, for example, a handheld electronic device such as the handheld electronic device described above with respect to FIGS. 1 and 3A-3B, which may communicate with the HMD to facilitate user interaction with the virtual environment generated by the HMD. For example, as described above, manipulation and/or physical movement of the second (handheld) electronic device 402 may be translated into a desired interaction in the virtual environment generated by the first (head mounted) electronic device 400.

The first electronic device 400 may include a sensing system 460 and a control system 470, which may be similar to the sensing system 160 and the control system 170, respectively, shown in FIGS. 2A and 2B. In the example implementation shown in FIG. 4, the sensing system 460 may include numerous different types of sensors, including, for example, a light sensor, an audio sensor, a distance/proximity sensor, and/or other sensors and/or different combination(s) of sensors. In some implementations, the light sensor, image sensor and audio sensor may be included in one component, such as, for example, a camera, such as the camera 180 of the HMD 100 shown in FIGS. 2A and 2B. The control system 470 may include numerous different types of devices, including, for example, a power/pause control device, audio and video control devices, an optical control device, a transition control device, and/or other such devices and/or different combination(s) of devices. In some implementations, one module of a video control device of the control system 470 may be configured to generate and display one or more user interfaces as described above, and another module of the video control device may be configured to generate and display a mono-chromatic screen, or green screen, as described above, or a single module of the video control device of the control system 470 may be configured to generate and display the one or more user interfaces and the green screen. In some implementations, the sensing system 460 and/or the control system 470 may include more, or fewer, devices, depending on a particular implementation. The elements included in the sensing system 460 and/or the control system 470 can have a different physical arrangement (e.g., different physical location) within, for example, an HMD other than the HMD 100 shown in FIGS. 2A and 2B.

The first electronic device 400 may also include an audio output device 430 and an image output device 440, which may be similar to, for example, the audio output device 130 and the display 140 shown in FIGS. 2A and 2B. The audio output device 430 and the image output device 440 may output audio and video signals related to the virtual immersive experience generated by the first electronic device 400. The first electronic device 400 may also include a processor 490 in communication with the sensing system 460 and the control system 470, a memory 480 accessible by, for example, a module of the control system 470, and a communication module 450 providing for communication between the first electronic device 400 and another, external device, such as, for example, the second electronic device 402 paired with the first electronic device 400.

The second electronic device 402 may include a communication module 406 providing for communication between the second electronic device 402 and another, external device, such as, for example, the first electronic device 400 operably coupled with, or paired with the second electronic device 402. The second electronic device 402 may include a sensing system 407 including, for example, an image sensor and an audio sensor, such as is included in, for example, a camera and microphone, an inertial measurement unit, and other such sensors and/or different combination(s) of sensors. A processor 409 may be in communication with the sensing system 407 and a controller 405 of the second electronic device 402, the controller 405 having access to a memory 408 and controlling overall operation of the second electronic device 402. The second electronic device 402 may also include an audio output device 403 and an image output device 404, which may be similar to, for example, the audio output device 103 and the display 106 shown in FIGS. 3A-3B. The audio output device 403 and the image output device 404 may output audio and image signals which, in some implementations, may provide an interface for user input and interaction with the second electronic device 402 and/or with the first electronic device 400 operably coupled with, or paired with, the second electronic device 402.

In some implementations, a text entry, or other input made by the user via the user interface 107 as described herein, may include, for example, an input of login information, an input related to instructions to be carried out in the virtual environment such as character selections, equipment selections, environment selections and the like, and other such inputs. In some situations, a user immersed in the virtual environment may receive, for example, an incoming phone call or text message which may temporarily interrupt the user's interaction in the virtual environment generated by the HMD 100. FIGS. 5A-5E illustrate an example in which an incoming text message alert is received while the user is immersed in an ongoing virtual experience, simply for ease of discussion and illustration. However, as noted above, the process to be described herein may be applied to numerous other instances in which an input, for example, a text input, a selection, a slide input, or other type of input, may be made by the user via a user interface on a handheld electronic device.

Figure 5A:
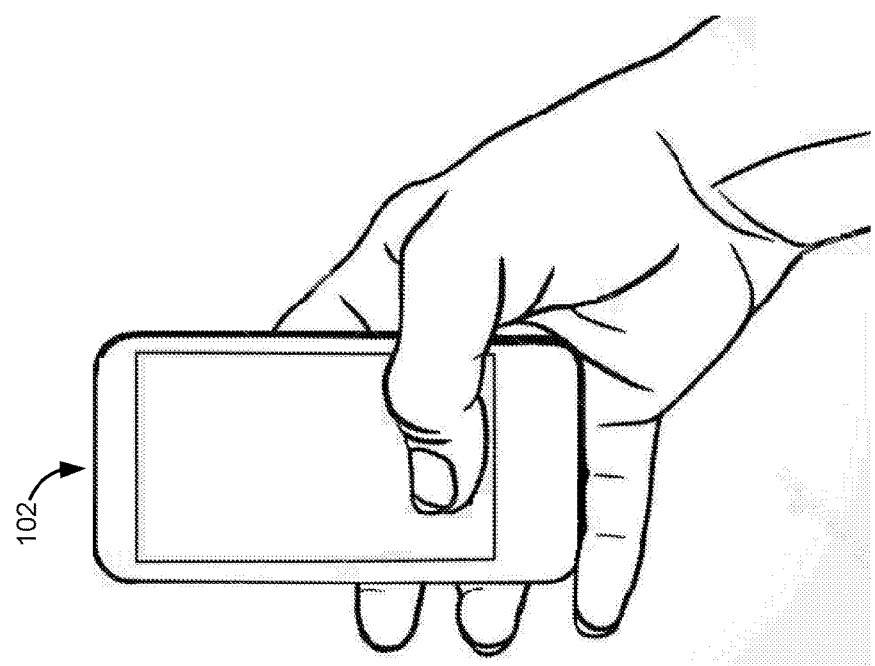
FIGS. 5A-5E illustrate detection and tracking of a position of a manual pointing device relative to a user interface of a handheld electronic device, and display of manual inputs received at the user interface, on a head mounted electronic device, in accordance with implementations described herein.
Figure 5A:
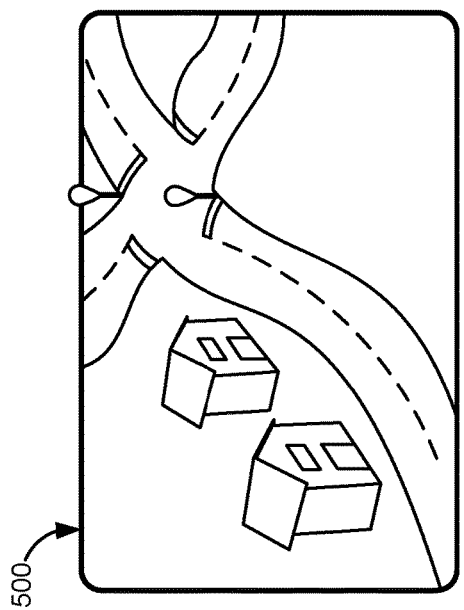
Figure 5B:
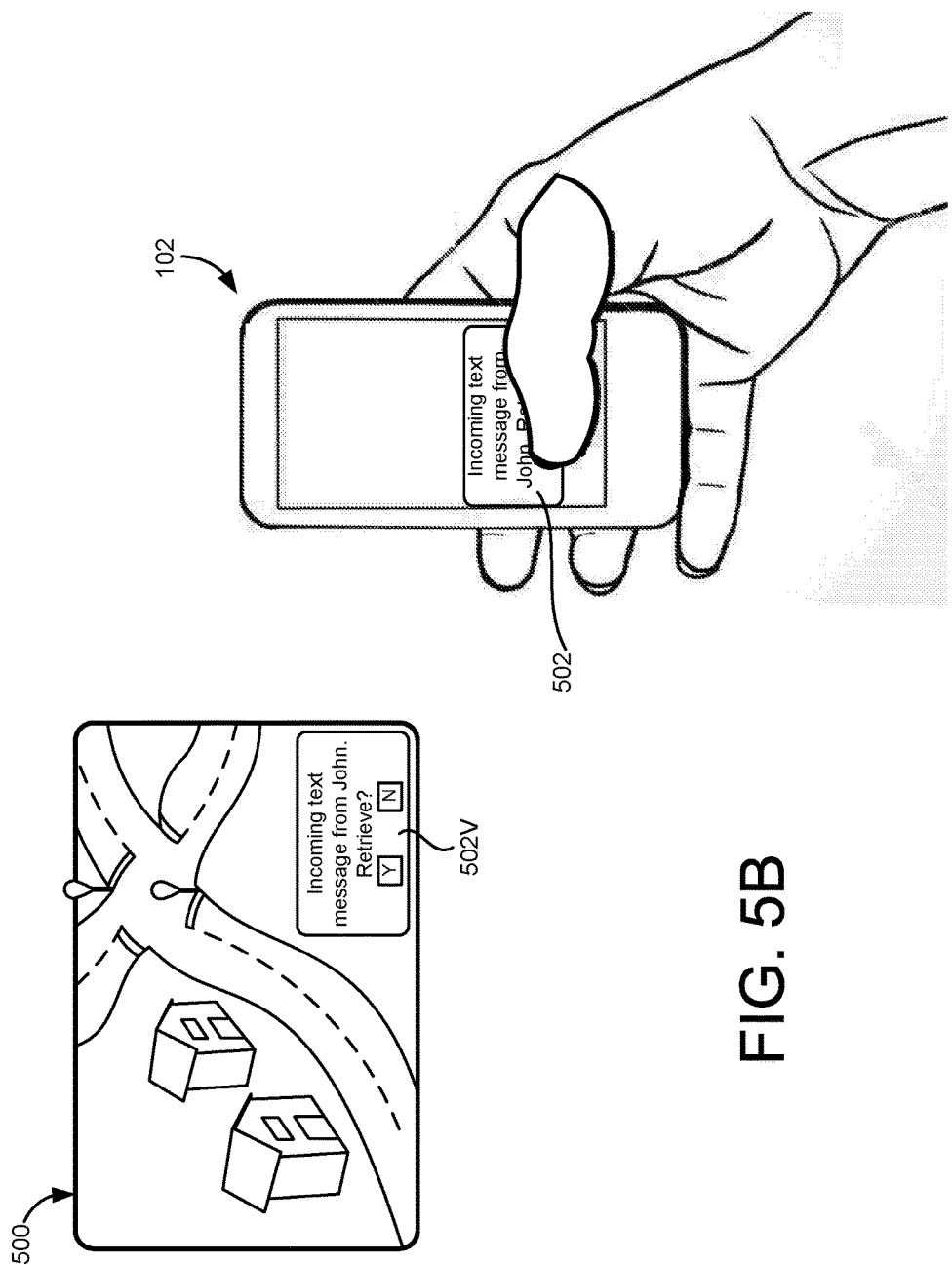

An example of a virtual scene 500, as viewed by the user, for example, on the display 140 of the HMD 100, is shown in FIG. 5A. FIG. 5A also illustrates the user physically holding the handheld electronic device 102, which may be operably coupled with the HMD 100, for interaction in the virtual environment generated by the HMD 100. While the user is immersed in the virtual environment, for example immersed in the virtual scene 500, generated by the HMD 100, an incoming text message may be received by the handheld electronic device 102. In this example, an alert 502 in the form of a visual indicator may be generated, alerting the user to the incoming text message. The alert 502 may be displayed on the display 106 of the handheld electronic device 102. However, because the user is wearing the HMD, the display 106 of the handheld electronic device 102, and the alert 502, may not be directly visible to the user. Thus, a virtual rendering of the alert 502, or a corresponding virtual alert 502V, may be displayed in the virtual scene 500 viewed by the user, as shown in FIG. 5B, so that the virtual alert 502V is visible to the user without removing the HMD 100. A mono-chromatic screen 108, such as, for example, a green screen 108, may be rendered and overlaid on the user interface of the handheld electronic device 102 (e.g., the physical device), and in particular the green screen 108 may be overlaid on the display 106 of the handheld electronic device 102 on which the alert 502 is displayed, the alert 502 providing for user selection of a "Y" button or an "N" button indicating whether or not the user wants to retrieve the incoming message.

In some implementations, the mono-chromatic screen 108 may be generated and overlaid on the user interface of the handheld electronic device 102 in response one or more triggering events. Triggering event may include, for example, a user alert anticipating a user input and/or response via the user interface on the handheld electronic device 102, anticipation of user input based on user interaction with a virtual object in the virtual environment, movement of the user and/or the handheld electronic device 102 to indicate input via the user interface, and other situations related to user input via the user interface in which tracking of the user's finger/hand position relative to the user interface will facilitate input.

Figure 5C:
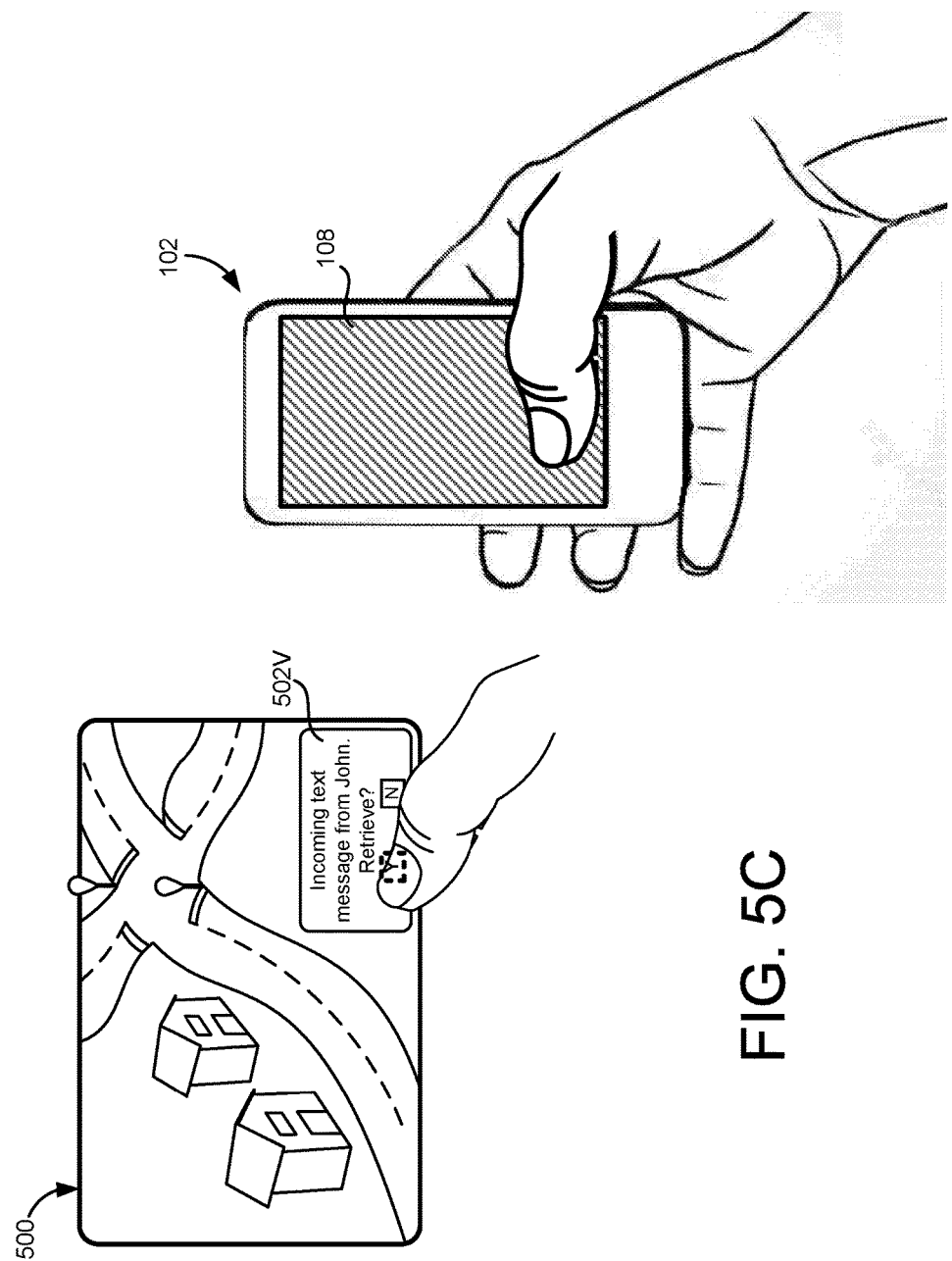

As shown in FIG. 5C, the green screen 108 may be overlaid on the display 106 of the handheld electronic device 102, including the area of the display 106 at which the alert 502 would be displayed/otherwise visible on the physical device 102, while the virtual alert 502V is displayed in the virtual scene 500 as viewed by the user. That is, the user may view (e.g., virtually view) the virtual scene 500 on the display of the HMD 100 including the virtual alert 502V and the selection buttons "Y" and "N" which the user may select to indicate whether or not the user intends to retrieve the incoming message. As described above, the overlay of the green screen 108 on the user interface of the handheld electronic device 102 (e.g., the physical device) may allow the camera 180 of the HMD 100 to quickly and accurately capture, detect and track a position of the user's finger relative to the handheld electronic device 102, and in particular a position of the user's finger(s) relative to the user interface (in this example, the alert 502 and selection buttons Y and N).

An image of the user's finger positioned relative to the virtual user interface, or virtual alert 502V and selection buttons Y and N, may be displayed to the user in the virtual scene 500, as shown in FIG. 5C. The image of the user's finger relative to the user interface may be captured by, for example, the camera 180 on the HMD 100, and a virtual image of the user's finger relative to the virtual user interface (for example, the virtual alert 502V) may be displayed in the virtual scene 500 as a pass through image captured by the camera 180. In some implementations, the image of the user's finger relative to the virtual user interface 107V may be rendered by, for example the processor of the HMD 100 based on the image captured by the camera 180 of the HMD 100, and the virtual rendering of the user's finger may be displayed in the virtual scene 500. In some implementations, the image of the user's finger relative to the virtual user interface 107V (in this example, the virtual alert 502V) may be overlaid on the current virtual scene 500, as shown in FIG. 5C, or may replace the current virtual scene 500 in the user's field of view.

Figure 5D:
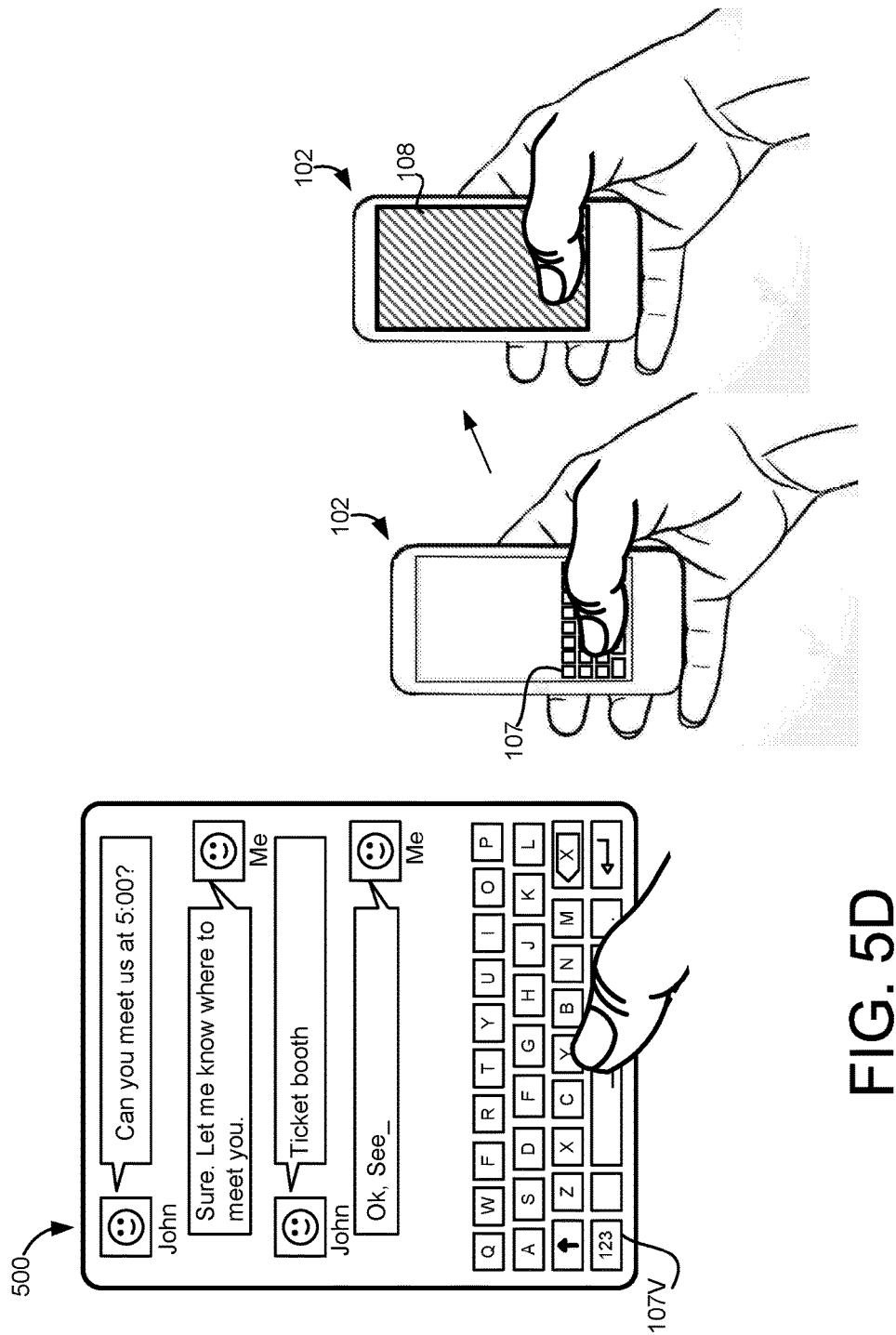

Upon retrieving the incoming message, as shown in FIG. 5D, a text messaging session may proceed between the user and the sender of the incoming message. The text messaging session may be visible to the user via the virtual scene 500 virtually displayed to the user, for example, on the display 140 of the HMD 100. As shown in FIG. 5D, to provide for text entry, the keyboard 107 may be made available on the user interface of the physical handheld electronic device 102, and the green screen 108 may be overlaid on the user interface, or keyboard 107, of the physical handheld electronic device 102, to facilitate the detection and tracking of finger position relative to the user interface by the camera 180 of the HMD 100 as described above.

As shown in FIG. 5D, in some implementations, while the green screen 108 is rendered and is overlaid on (or replaces) the keyboard 107 generated by the handheld electronic device 102, a corresponding virtual keyboard 107V may be rendered in the virtual scene 500 displayed to and viewed by the user on the HMD 100, so that a rendering of the keyboard 107 on the handheld electronic device 102 and a finger position with respect to the keyboard 107, in the form of the virtual keyboard 107V in the virtual scene 500, may be viewed by the user via the display 140 of the HMD 100.

Figure 5E:
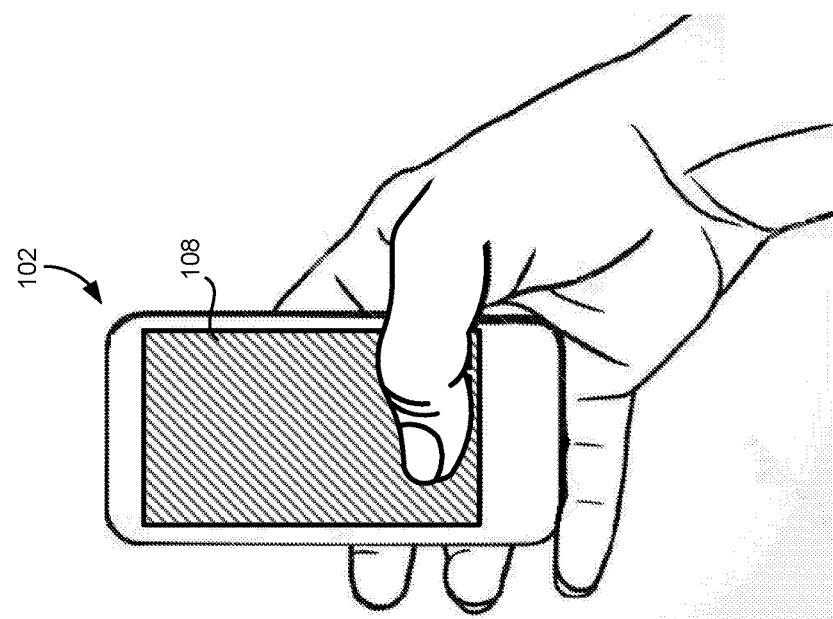
Figure 5E:
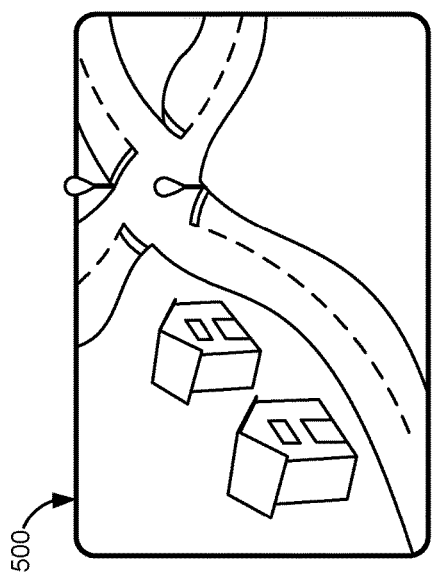

As noted above, a hover position of the user's finger relative to the keyboard 107 on the handheld electronic device 102 may be captured by, for example, the camera 180 of the HMD 100. Because the image of the user's finger is captured against the green screen 108 overlaid on the display 106 displaying the user interface, or keyboard 107, on the handheld electronic device 102, a position of the finger may be accurately and efficiently detected, tracked and displayed (either as a pass through image or as a rendered image), essentially real time. The essentially real time detection, tracking and display of the finger position against the green screen 108, with the user interface in the form of the keyboard 107 in this example, may allow the user to view a virtual visual representation of the entry of text in the virtual scene 500, without removing the HMD 100 and/or terminating the virtual immersive experience to obtain visibility of the physical handheld electronic device 102. Because the user interface (and functionality associated therewith), in the form of the keyboard 107 on the physical handheld electronic device 102 in this example, remains active while overlaid by the green screen 108, the handheld electronic device 102 may register a user input in response to an actual touch (e.g., physical contact) on the touch sensitive surface of the display 106 of the handheld electronic device 102 as discussed above. Upon completion of the messaging session shown in FIG. 5D, the user may resume activity in the virtual environment, with minimal interruption, as shown in FIG. 5E.

The phrase green screen has been used throughout to refer to keying, in which a subject in the foreground may be detected and tracked against a background defined by a single color screen, or mono-chromatic screen, the single color of the mono-chromatic screen not duplicated by the subject in the foreground. Although green is used as the example color in the implementations of a mono-chromatic screen as described herein, any single color may be used for the overlay rendered by the handheld electronic device, as long as that single color is not duplicated in the item to be tracked (in this case, the user's hand(s) and/or finger(s)) and there is adequate color separation between the subject in the foreground (in this case, the user's hand(s) and/or finger(s)) and the background. For example, in some implementations, the mono-chromatic screen may be rendered in, for example, a blue or grey or black hue, or any other single color that provides for adequate color separation.

Figure 6:
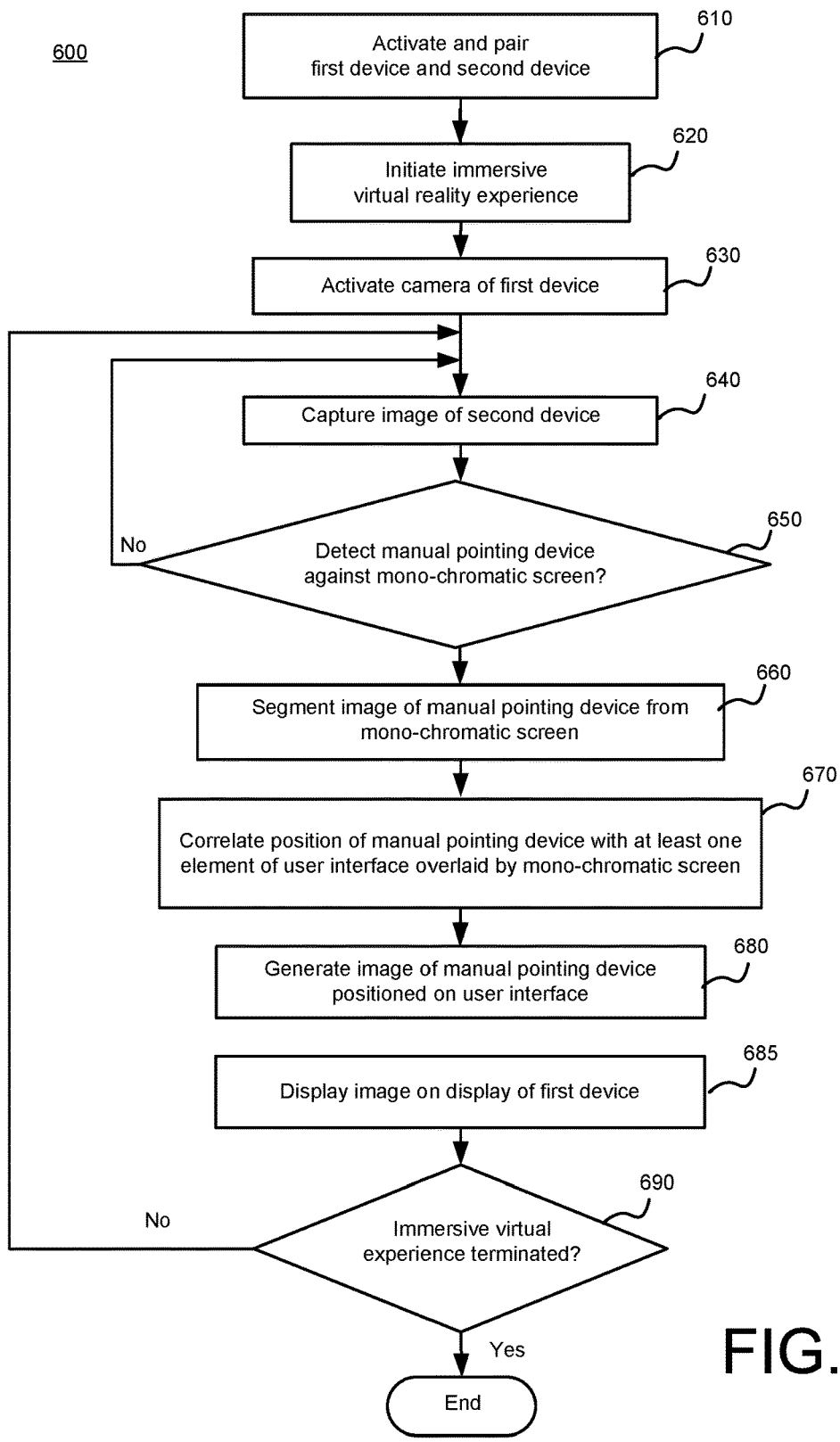
FIG. 6 is a flowchart of a method of detecting and tracking a hover position of a pointing device relative to a user interface of a handheld electronic device in an augmented and/or virtual reality system, in accordance with implementations described herein.

A method 600 of detecting a hover position of a user's hand(s) and/or finger(s) relative to a handheld electronic device in an augmented reality and/or a virtual reality system, in accordance with implementations described herein, is shown in FIG. 6. As noted above, the handheld electronic device may be similar to the handheld electronic device 102 shown in FIGS. 1 and 3A-3B, and may be paired with, for example, an HMD such as, for example, the HMD 100 as shown in FIGS. 1 and 2A-2B, to generate an immersive virtual environment to be experienced by the user. The handheld electronic device 102 may be paired with, and/or communicate with, the HMD 100 by, for example, via a wired connection, a wireless connection via for example wifi or Bluetooth, or other type of connection. After the HMD 100 and the handheld electronic device 102 have been activated and paired, at block 610, and an immersive virtual reality experience has been initiated at block 620, a camera, such as, for example, the camera 180 of the HMD 100, or other camera within the system that is capable of capturing an image of the user's hand(s) and the handheld electronic device 102, may be activated to capture an image of the handheld electronic device 102 at blocks 640 and 650.

As noted above, the image captured by the camera 180 of the HMD 100 may include an image of the finger(s) and/or hand(s) of the user against the mono-chromatic screen, or green screen 108, rendered and overlaid on the user interface, for example, on the keyboard 107 displayed on the display 106 of the handheld electronic device 102. If, at block 650, a manual pointing device, such as, for example, a finger, is detected against the mono-chromatic screen 108 in the image captured by the camera 180, the image of the manual pointing device may be segmented from the background defined by the mono-chromatic screen 108, at block 660, and a position of the manual pointing device may be correlated with at least one element of the user interface overlaid by the mono-chromatic screen 108, at block 670. For example, at least a position of a finger detected within the captured image, against the green screen 108 may be correlated with at least one key of the keyboard 107 that has been overlaid by the green screen 108 on the display 106 of the handheld electronic device 102.

An image of the manual pointing device on the user interface at the correlated position, such as, for example, the finger at a position corresponding to one of the keys of the keyboard 107, may be segmented from the image captured by the camera 180, at block 680, and the image of the finger may be displayed in the virtual scene generated by the HMD 100, for example, relative to the virtual keyboard 107V displayed in the virtual scene 500 by the HMD 100, at block 685. In some implementations, the image of the manual pointing device on the user interface at the correlated position (i.e., the finger at a position corresponding to one of the keys of the keyboard 107) may be rendered, for example, by a processor of the HMD 100, and displayed in the virtual scene, at an appropriate position with respect to the virtual keyboard 107V displayed in the virtual scene 500. In this manner, the user may view a position of the finger on the virtual keyboard 107V, corresponding to the detected position of the finger relative to the keyboard 107 of the user interface of the physical handheld electronic device 102, without the physical handheld electronic device 102 being directly visible to the user, thus facilitating manual entry of user inputs through a touch screen surface of the handheld electronic device 102 in an augmented and/or virtual reality environment.

This process may be repeatedly performed until it is determined, at block 690, that the virtual immersive experience has been terminated.

Figure 7:
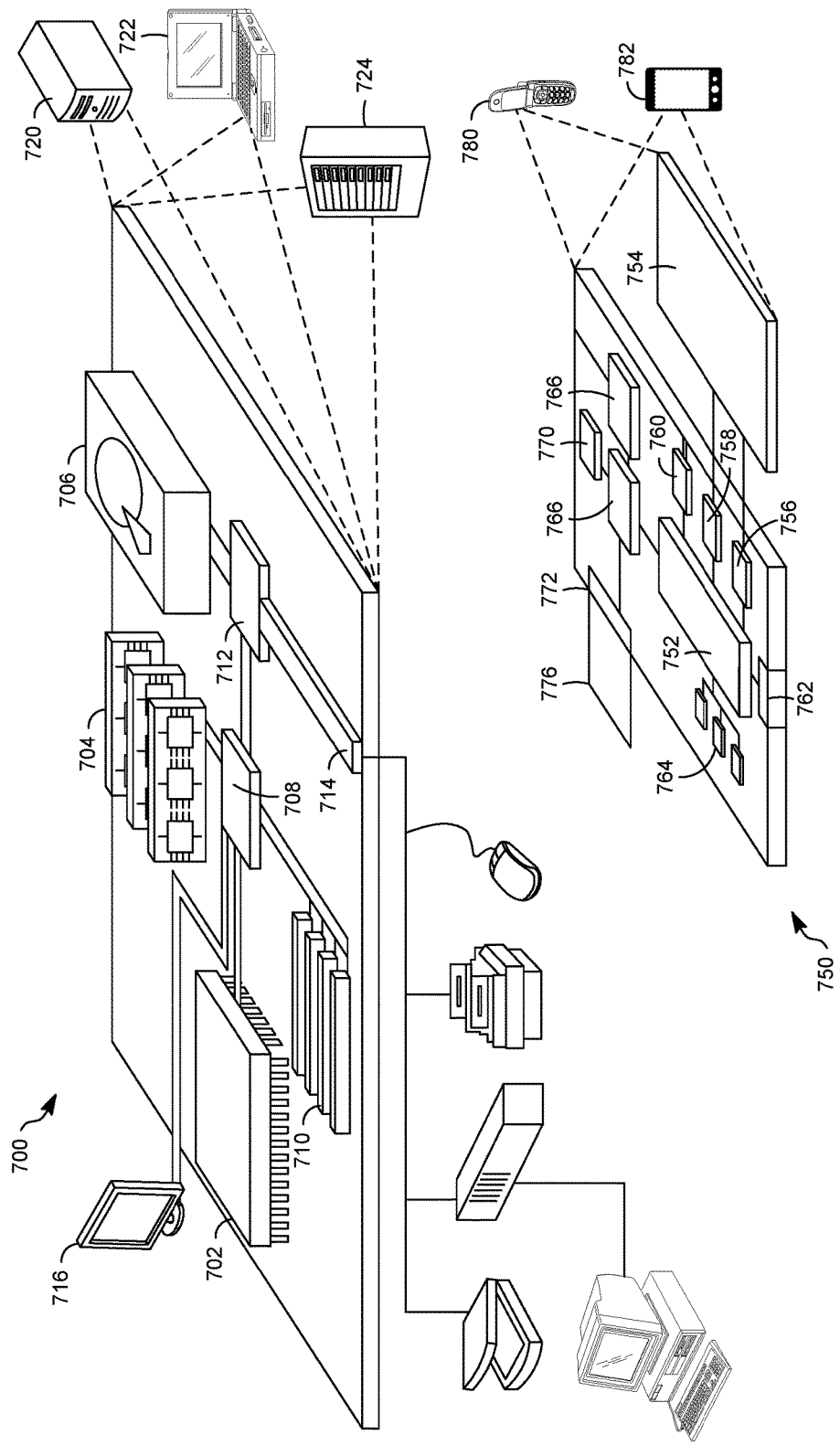
FIG. 7 shows an example of a computer device and a mobile computer device that can be used to implement the techniques described herein.

FIG. 7 shows an example of a generic computer device 800 and a generic mobile computer device 750, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   generating, by a head mounted electronic device operating in an ambient environment, a virtual environment;
   displaying a virtual alert as a virtual image in response to a detection of an incoming event that is separate from the virtual environment, the virtual alert including a user input window;
   detecting, by a camera of the head mounted electronic device, a physical object in a foreground of a mono-chromatic screen on a handheld electronic device operating in the ambient environment, the mono-chromatic screen being generated in response to the display of the visual alert, the mono-chromatic screen being overlaid on a user interface within a touchscreen display of the handheld electronic device such that the user interface is not visible through the mono-chromatic screen overlaid on the user interface, while maintaining touchscreen functionality of the user interface, the detecting of the physical object including:
  capturing an image of the handheld electronic device, the captured image including the physical object in the foreground of the mono-chromatic screen displayed on the handheld electronic device; and
  segmenting, from the captured image, an image of the physical object from the mono-chromatic screen surrounding the physical object;
determining, by a processor of the head mounted electronic device, a position of the detected physical object relative to the user interface overlaid by the mono-chromatic screen based on a detected position of the physical object in the foreground of the mono-chromatic screen;
displaying, on a display of the head mounted electronic device, a virtual image of the user interface and a virtual image of the detected physical object, including displaying the segmented image of the detected physical object at a position relative to the virtual image of the virtual user interface corresponding to an actual position of the detected physical object relative to the user interface overlaid by the mono-chromatic screen;
detecting a touch input on the touchscreen display, the detected touch input corresponding to an element of the user interface overlaid by the mono-chromatic screen; and
executing a command corresponding to the element of the user interface in response to the detected touch input.

2. The method of claim 1, detecting the physical object in the foreground of the mono-chromatic screen including:
  detecting a green screen overlaid on a keyboard displayed on the display of the handheld electronic device.

3. The method of claim 2, detecting the physical object in the foreground of the mono-chromatic screen and determining a position of the detected physical object relative to the user interface including:
  detecting a position of a finger against the green screen; and
  mapping the detected position of the finger against the green screen to a position of the finger relative to the keyboard displayed on the display of the handheld electronic device and overlaid by the green screen based on a known arrangement of keys of the keyboard displayed on the display of the handheld electronic device.

4. The method of claim 3, detecting the touch input on the touchscreen display including:
  receiving a character input in response to detected physical contact between the finger and the user interface displayed within the display of the handheld electronic device, the detected physical contact corresponding to a position of one of the keys of the keyboard displayed on the display of the handheld electronic device and overlaid by the green screen; and
  displaying the received character input in a virtual display generated by the head mounted electronic device.

5. The method of claim 4, further comprising repeating the detecting of the physical object, the determining of the position of the physical object, the displaying of the virtual image of the user interface and the virtual image of the physical object, the receiving of the character input, and the displaying of the received character input until a character input mode is terminated.

6. The method of claim 1, displaying the segmented image of the detected physical object including displaying the segmented image as a pass through image from the camera on the display of the head mounted electronic device.

7. The method of claim 1, displaying the segmented image of the detected physical object including:
  rendering the segmented image of the detected physical object; and
  displaying the rendered image of the segmented image of the detected physical object on the display of the head mounted electronic device.

8. The method of claim 1, wherein the detected physical object is positioned between the head mounted electronic device and the handheld electronic device.

9. The method of claim 1, the detection of the incoming event including detecting receipt of a text message, a voice call, or electronic mail.

10. A system, comprising:
  a head mounted electronic device including a display, a camera and a processor, the head mounted electronic device configured to be operably coupled with a handheld electronic device, wherein
  the camera is configured to capture an image of the handheld electronic device, and
  the processor is configured to:
    display a virtual alert as a virtual image in response to a detection of an incoming event that is separate from the virtual environment, the virtual alert including a user input window;
    detect a physical object between the head mounted electronic device and a user interface displayed on a touchscreen display of the handheld electronic device in the image captured by the camera, including:
      capture an image of the handheld electronic device, the captured image including the physical object in the foreground of a mono-chromatic screen displayed on the handheld electronic device; and
      segment, from the captured image, an image of the physical object from the mono-chromatic screen surrounding the physical object,
    the mono-chromatic screen being generated in response to the display of the visual alert, the user interface being overlaid by the mono-chromatic screen such that the user interface is not visible through the mono-chromatic screen overlaid on the user interface, while touchscreen functionality of the user interface is maintained;
    display, on the display of the head mounted electronic device, a virtual image in a virtual scene displayed on the display of the head mounted electronic device based on the image captured by the camera, the virtual image displayed in the virtual scene including a virtual image of the detected physical object, and a virtual image of the user interface of the handheld electronic device, with the segmented image of the detected physical object displayed at a position relative to the virtual image of the virtual user interface corresponding to an actual position of the detected physical object relative to the user interface overlaid by the mono-chromatic screen;

detect a touch input on the touchscreen display, the detected touch input corresponding to an element of the user interface overlaid by the mono-chromatic screen; and execute a command corresponding to the element of the user interface in response to the detected touch input.

11. The system of claim 10, wherein the detected physical object is a finger of a user, and the user interface is a keyboard overlaid by the mono-chromatic screen displayed on the display of the handheld electronic device, and wherein the virtual image displayed in the virtual scene displayed by the head mounted electronic device includes a virtual image of the finger of the user hovering over one of a plurality of keys of the keyboard on the display of the handheld electronic device.

12. The system of claim 11, wherein the processor is configured to determine a position of the finger relative to the keyboard on the display of the handheld electronic device based on the detected position of the finger relative to the mono-chromatic screen and a known arrangement of the plurality of keys of the keyboard on the display of the handheld electronic device.

13. The system of claim 11, wherein the processor is configured to receive a character input in response to detected physical contact between the finger and a portion of the display of the handheld electronic device corresponding to one of the keys of the keyboard on the display of the handheld electronic device, and to display, on the display of the head mounted electronic device, a virtual image of the character input in the virtual image displayed in the virtual scene displayed on the display of the head mounted electronic device.

14. The system of claim 10, wherein, in displaying the segmented image of the detected physical object, the processor is configured to display the segmented image of the detected physical object as a pass through image, from the camera of the head mounted electronic device, in the virtual scene displayed on the display of the head mounted electronic device.

15. The system of claim 10, wherein, in displaying the segmented image of the detected physical object, the processor is configured to:
  render an image of the segmented image of the detected physical object; and
  display the rendered image of the segmented image of the detected physical object in the virtual scene displayed on the display of the head mounted electronic device.

16. The system of claim 10, wherein the processor is configured to display the virtual image of the user interface without the mono-chromatic screen overlaid on the user interface, such that individual elements of the user interface are visible in the virtual scene displayed by the head mounted display device.

17. The system of claim 10, the detection of the incoming event including detecting receipt of a text message, a voice call, or electronic mail.

18. A computer program product embodied on a non-transitory computer readable medium, the computer readable medium having stored thereon a sequence of instructions which, when executed by a processor causes the processor to execute a method, the method comprising:
  generating a virtual environment in a head mounted electronic device operating in an ambient environment;
  displaying a virtual alert as a virtual image in response to a detection of an incoming event that is separate from the virtual environment, the virtual alert including a user input window;
  capturing, by a camera of the head mounted electronic device, an image of a handheld electronic device operably coupled with the head mounted electronic device;
  detecting, in the image captured by the camera, a physical object in a foreground of a mono-chromatic screen overlaid on a user interface displayed on a touchscreen display of the handheld electronic device, the mono-chromatic screen being generated in response to the display of the visual alert, the detecting of the physical object including:
    capturing an image of the handheld electronic device, the captured image including the physical object in the foreground of the mono-chromatic screen displayed on the handheld electronic device; and
    segmenting, from the captured image, an image of the physical object from the mono-chromatic screen surrounding the physical object,
  the mono-chromatic screen covering the user interface such that the user interface is not visible through the mono-chromatic screen, and the user interface maintaining touchscreen functionality beneath the mono-chromatic screen;
  segmenting the detected physical object from the image captured by the camera and generating an image of the segmented physical object;
  detecting a position of the detected physical object relative to the user interface overlaid by the mono-chromatic screen based on a detected position of the physical object in the foreground of the mono-chromatic screen;
  displaying, on a display of the head mounted electronic device, a virtual image in the virtual environment displayed on the display of the head mounted electronic device, the virtual image including a virtual image of the user interface and a virtual image of the segmented physical object, including displaying the segmented image of the detected physical object at a position relative to the virtual image of the virtual user interface corresponding to an actual position of the detected physical object relative to the user interface overlaid by the mono-chromatic screen;
  detecting a touch input on the touchscreen display, the detected touch input corresponding to an element of the user interface overlaid by the mono-chromatic screen; and
  executing a command corresponding to the element of the user interface in response to the detected touch input.

19. The computer program product of claim 18, displaying the virtual image in the virtual environment displayed on the display of the head mounted electronic device further comprising:
  displaying the segmented image of the detected physical object as a pass through image, from the camera of the head mounted electronic device, on the display of the head mounted electronic device.

20. The computer program product of claim 18, the detection of the incoming event including detecting receipt of a text message, a voice call, or electronic mail.

* * * * *